May 10, 1927.
F. T. GAUSE
TIRE CHAIN
Filed April 24, 1925
1,627,555
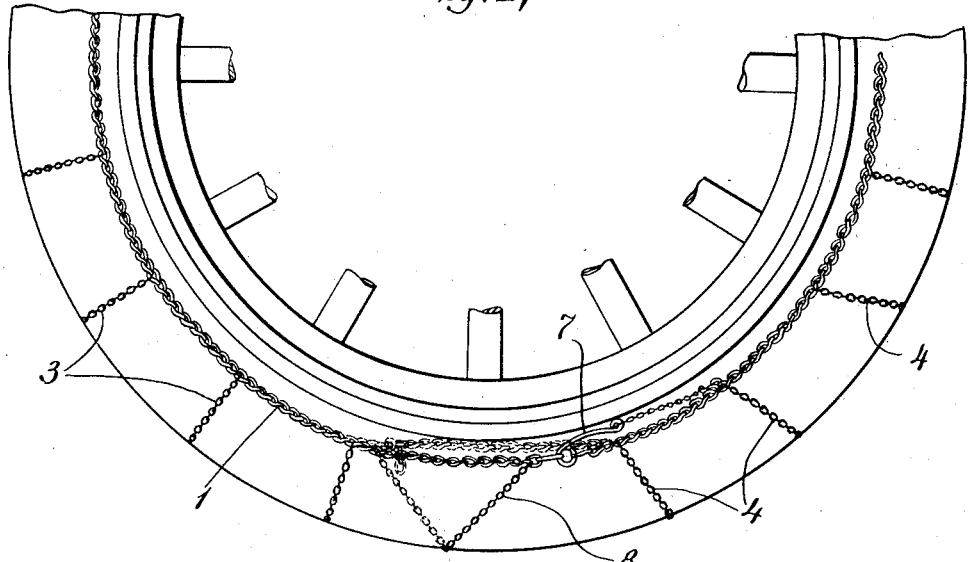
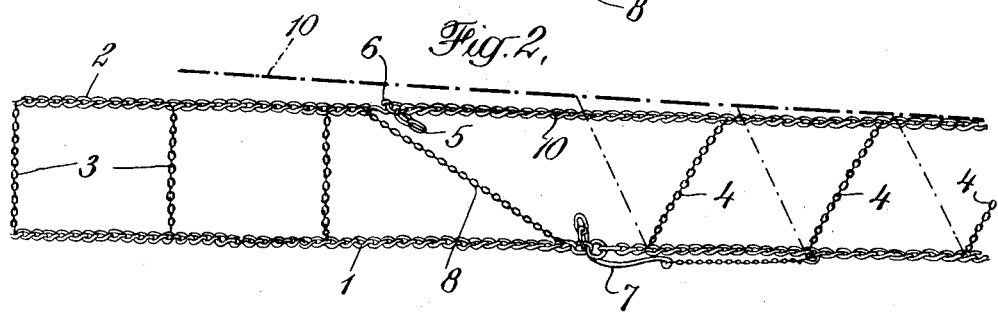
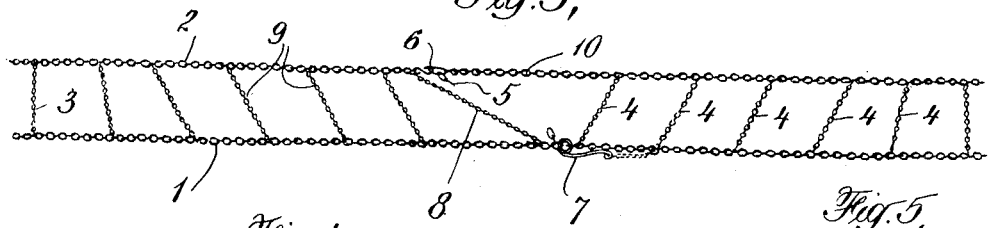
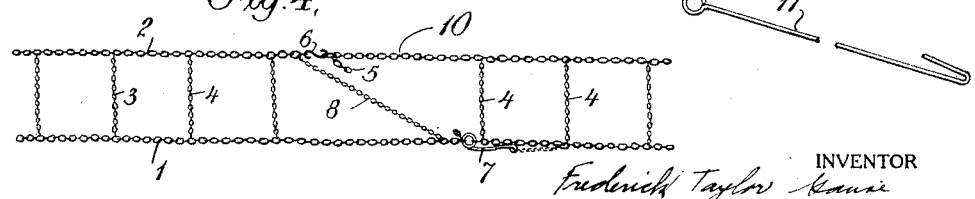
INVENTOR
Frederick Taylor Gause
BY
Pennie Davis Marvin & Edmonds
ATTORNEYS Patented May 10, 1927.

1,627,555

UNITED STATES PATENT OFFICE.

FREDERICK TAYLOR GAUSE, OF WILMINGTON, DELAWARE.

TIRE CHAIN.

Application filed April 24, 1925. Serial No. 25,472.

The present invention relates to tire chains such as used in connection with automobiles or similar pneumatic tired vehicles for increasing the tractive grip of the wheels and preventing skidding on soft or slippery road surfaces.

It is a principal object of this invention to provide a chain possessing a simplicity of construction entirely comparable with that of the ordinary type of tire-chain, yet which may be put in place on the tire with a minimum of time and effort, without necessity of jacking up or moving the vehicle and without necessity of the operator reaching around the tire or through the wheel in order to secure the chain in place. The present invention saves most of the time ordinarily required in putting the chain on the tire by reason of the fact that it eliminates the necessity of rolling the car back onto the chains and provides connections between the ends of the respective side chains which are easily accessible for fastening.

In my Reissue Patent No. 15,893 there is disclosed a tire chain which may be applied to the wheel in an easy and convenient fashion without the necessity of moving the vehicle or the wheel.

The present chain is intended particularly as an improvement and simplification over the chain described in the above noted patent in that the advantages of the chain there described, consisting largely in the ease and convenience of applying the chain to the wheel without necessity of reaching around the wheel to inaccessible connections and without necessity of moving or jacking up the wheel, are obtained with a simpler and less expensive construction.

The present chain employs the usual two side chains having cross chains extending between them at suitable intervals along their length. The side chains are each broken at one point in much the same fashion as with the ordinary type of tire chain.

The invention resides in the positioning and proportioning of the respective elements of the chain in such fashion that the inner side chain may be drawn back during application of the chain to the tire so that the connection between the ends of that chain is readily established in an accessible position, while at the same time drawing back of the chain to establish this connection does not draw the entire chain off of the tire but leaves it in an accessible position where its ends may be fastened together in a moment's time and without moving the vehicle.

A preferred embodiment of the invention is illustrated in the accompanying drawing in which Figure 1 is a side elevational view showing a chain embodying the invention applied to an automobile tire; Fig. 2 is a plan view showing the construction of the chain; Fig. 3 is a view similar to Fig. 2, illustrating a modified form of chain; Fig. 4 is a similar view showing a further modification; and Fig. 5 is a perspective view of a tool which may be used in applying the tire chain.

Referring to the drawings, 1 and 2 indicate the side chains. Each side chain assumes a generally circular form somewhat larger in diameter than the rim of the wheel, but of small enough diameter so that the side chain lies adjacent the tire at a point inside the maximum bulge of the tire. The cross chains extending over the tread of the tire and joining the outer side chain 1 and the inner side chain 2 are indicated at 3 and, as shown, are spaced about the periphery of the tire at substantially uniform intervals to thus engage with the road surface and increase the traction between the wheel and the road.

The present chain differs in construction from the ordinary chain largely in that several of the cross chains immediately adjacent one end of the respective side chains are slanted with respect to the length of the side chains, as indicated at 4. Several of these cross chains, say for instance, five or six of them, are slanted so that the portion of the tire chain having the slant cross chains extends from the bottom of the wheel up to approximately its horizontal axis, that is, about one-fourth of the way around the wheel. The end of the inner side chain 2 adjacent the slant chains 4 is provided with several flat links 5 so that the hook 6 at the other end of the side chain 2 can be engaged with any one of the links 5 to thus establish a connection between the ends of the side chain 2 and secure a proper tension in the chain. The side chain 1 is provided with a fastening link 7 which comprises a lever portion and a link portion after the fashion disclosed in my above mentioned patent.

At the other end of the tire chain the cross chains, except the last one, may be attached as in the ordinary manner, that is, extending directly across the tire and perpendicularly to the side chains when the chain is in place on the wheel. The last chain 8 extends diagonally between the side chains. The end of the chain 8 which is attached to the inner side chain 2 is connected to the side chain at a point closely adjacent the nearest cross chain 3, while the other end of the chain 8 is attached near the end of the side chain 1 and close to the fastener 7. By this arrangement the other end of the inner side chain extends a considerable distance beyond the point of attachment of the first cross chain, providing a free length of chain 10.

In applying the chain to the wheel it is first laid over the wheel in such position that the break in the side chains occurs substantially at the bottom of the wheel. In the drawings here shown, the chain is being applied to the right rear wheel of the automobile. The portion of the chain containing the slanted cross chains 4 lies at the forward side of the wheel. The operator then tosses the free end 5 of the chain 2 backwardly at the inside of the wheel where it may readily be reached from the rear of the wheel without necessity of reaching around the tire or through the spokes. If desired, the drawing back of this end of the inner chain 2 may be accomplished by means of a hook 11 such as shown in Fig. 5. The result is that the fastening hook 6 on the chain may be engaged with one of the links 5 to thus establish a connection between the ends of the inner chain 2 while the parts are pulled back into accessible position at the rear of the wheel.

When the inner chain 2 is drawn back into fastening position the elongation resulting from the slanted cross chain and the free end portion 10 of the inner side chain permits the fastening of the inner chain without pulling enough of the outer chain around to the inside to dislodge the chain from the tire. As the chain 2 is pulled back the slanted links 4 change their relative position of slant and turn about until they are slanted in the other direction. In the ordinary type of chain where the cross chains are at right angles with the side chains and no free end portion is provided, pulling back the inner chain will tend to slant over the cross chains and will thus lessen the distance between the side chains with the result that the outer chain 1 will be pulled over the tire to such a distance around the wheel that the whole chain will be dislodged. In the present chain, however, the inner chain 2 may be readily pulled back far enough for the fastener to be in easily accessible position. After the inner chain has been connected, the outside chain is tensioned and connected by means of the connecting member 7.

A modified structure is illustrated in Fig. 3 wherein not only are the cross chains 4 slanted but a second group of cross chains 9 at the opposite end of the chain are slanted in the opposite direction. This construction may be of advantage in certain instances in that it permits both ends of the inner side chain 2 to be moved towards each other for the purpose of establishing the connection without exerting a force on the outer side chain 1 tending to drag it under the wheel.

In the modification shown in Fig. 4 the slanted cross chains are omitted and ordinary transverse cross chains used in their place, the diagonal chain 8 and the free extension 10 being used as in the previously described chains. The chain of Fig. 4 does not permit the ends of the inner chain to be drawn quite so far to the rear in applying the chain to a rear wheel as do the chains illustrated in Figs. 2 and 3, but the point of attachment is considerably more successful than with the ordinary chain construction, particularly on small cars where the chain may be applied to the wheel without moving the car or reaching through the spokes to connect the ends of the inner chain.

I claim:

1. A tire chain comprising two side chains, cross chains connecting said side chains, the cross chain adjacent one end of said side chains being inclined with relation to said side chains and the adjacent cross chains, and fastening devices for fastening the ends of said side chains together, one part of each of said fastening devices being attached to said side chains adjacent the points of attachment of said inclined cross chain, the other parts of said fastening devices being at the other ends of said side chains, with one of said ends extending beyond the point of attachment of the last cross chain.

2. A tire chain comprising side chains, connections for closing the chain in operative position upon the tire, and cross chains extending between said side chains, the cross chains at one end of the tire chain being slanted in a common direction out of a perpendicular line between said side chains whereby relative lengthwise movement of the side chains at that end of the chain, to bring its connecting means into accessible position, is possible without decreasing the distance between the side chains at that point.

3. A tire chain comprising two side chains, a plurality of cross chains extending between said side chains at substantially right angles thereto, and a plurality of cross chains at one end of the tire chain permanently attached at each end to a side chain in a common direction which is slanted backward with respect to said first mentioned cross chains, whereby relative lengthwise movement of said side chains at that end of the chain is possible without reducing the perpendicular distance between the side chains.

4. A tire chain comprising two side chains, a plurality of cross chains extending perpendicularly between said side chains, a plurality of cross chains adjacent one end of the tire chain slanted in a common direction with respect to said perpendicular side chains, and a plurality of cross chains adjacent the other end of said chain slanted in a common direction with respect to said perpendicular chains and oppositely to the other slanted chains.

In testimony whereof I affix my signature.

FREDERICK TAYLOR GAUSE.